United States Patent [19]

Bhadra et al.

[11] Patent Number: 4,802,560
[45] Date of Patent: Feb. 7, 1989

[54] COMBINED WHEEL/BRAKE APPARATUS USING ELECTRO-RHEOLOGICAL FLUID

[75] Inventors: Dilip K. Bhadra; Richard L. Creedon, both of San Diego; C. Ross Harder, Rancho Santa Fe; Bourque, Robert F., San Diego, all of Calif.

[73] Assignee: General Atomics, San Diego, Calif.

[21] Appl. No.: 148,970

[22] Filed: Jan. 27, 1988

[51] Int. Cl.$^4$ .................. F16D 65/78; F16D 27/00
[52] U.S. Cl. ............................. 188/264 F; 188/164; 188/264 CC; 188/290; 188/296; 192/21.5
[58] Field of Search ............... 188/156, 155, 158, 216, 188/164, 264 F, 264 CC, 264 D, 290, 293, 296, 307, 712; 192/21.5

[56] References Cited

U.S. PATENT DOCUMENTS

| | | | |
|---|---|---|---|
| 2,525,571 | 10/1950 | Winther | 192/84 |
| 2,575,360 | 11/1951 | Rabinow | 192/21.5 |
| 2,620,900 | 12/1952 | Du Rostu | 188/164 |
| 2,661,825 | 12/1953 | Winslow | 192/21.5 |
| 2,685,947 | 8/1954 | Votrian | 192/21.5 |
| 2,690,241 | 9/1954 | Bachman | 188/205 |
| 2,791,308 | 5/1957 | Barrett et al. | 192/113 |
| 2,860,737 | 11/1958 | Hines | 188/164 |
| 2,928,509 | 3/1960 | Del Sole | 188/264 F |
| 3,208,567 | 9/1965 | Metzger | 192/12 |
| 3,262,534 | 7/1966 | Monroe et al. | 192/113 |
| 4,432,440 | 2/1984 | Crossman | 188/71.2 |
| 4,444,298 | 4/1984 | Stangroom | 192/21.5 |

FOREIGN PATENT DOCUMENTS 684211 9/1979 U.S.S.R. .

Primary Examiner—Andres Kashnikow
Assistant Examiner—Matthew C. Graham
Attorney, Agent, or Firm—Fitch, Even, Tabin & Flannery

[57] ABSTRACT

A combined wheel/brake apparatus employing an electro-rheological fluid. The apparatus includes a wheel rotatably mounted on an axle and a first array of spaced, electrically conductive vanes extending in a first direction with the vanes non-rotatably held by the axle. The apparatus also includes a second array of spaced, electrically and thermally conductive vanes extending in a direction opposite the first direction, with the second and first arrays interdigitated but not contacting. An electro-rheological fluid is in the spaces between the vanes. At least some of the second vanes have a coolant passageway and the apparatus further includes a secondary coolant supply for these passageways. The coolant passageways are isolated from the electro-rheological fluid so that application of an electrical potential across the two array vanes causes an increase in the viscosity of the electro-rheological fluid to develop a braking force, with heat occasioned by the braking being transmitted to the secondary coolant.

13 Claims, 1 Drawing Sheet

COMBINED WHEEL/BRAKE APPARATUS USING ELECTRO-RHEOLOGICAL FLUID

The present invention relates to a brake for slowing and stopping the rotation of a wheel and, more specifically, to a wheel/brake combination using electro-rheological fluid in which the selective application of electrical potential controls braking of the wheel.

BACKGROUND OF THE INVENTION

Common braking systems employ the frictional contact, between a drum or disc which rotates with the wheel and a brake shoe or pad carried by the axle, to slow rotation of the wheel. This frictional engagement generates heat which increases the temperatures of the components. These braking systems are normally limited because more heat is collected than is dissipated resulting in the temperature rising to levels at which the components are unable to maintain their braking functions.

An electro-rheological fluid is a fluid the viscosity of which changes in response to the application of an electric field. More specifically, such a fluid has the property of becoming relatively rigid upon application of the field having a component normal to the flow direction prior to application of the field. Such fluids and their applications in clutch devices are disclosed in U.S. Pat. Nos. 2,417,850 and 2,661,596 to Winslow. Such a fluid can be a slurry of fine hydrophilic solids in a hydrophobic liquid. The detailed operation of such fluid in a viscous shear clutch is disclosed in U.S. Pat. No. 4,444,298.

One proposed braking system includes a set of rotor plates interdigitated with a set of stator plates, and with a magnetic brake fluid disposed between the sets of plates. The magnetic brake fluid is a slurry or mixture of magnetic particles and a liquid such as oil. The braking system includes a radiator for cooling the brake fluid. For further information regarding the structure and operation of such a braking system, reference may be made to U.S. Pat. No. 2,690,241.

SUMMARY OF THE INVENTION

Among the various aspects and objects of the present invention may be noted the provision of an improved wheel/brake apparatus. The apparatus includes interdigitated rotating vanes and fixed vanes which do not touch and between which braking force is developed. The apparatus includes an electro-rheological fluid between the vanes so that by applying an electrical potential across the vanes, the viscosity of the fluid increases. A separate liquid coolant may be used in heat transfer relationship with the electro-rheological fluid. Gases resulting from boiling of the secondary liquid coolant are vented to atmosphere and additional liquid coolant is provided to replace the boil off. In some applications, the electro-rheological fluid itself could be cooled through a heat exchanger and recirculated. The wheel/brake apparatus is relatively light in weight and compact in size. Furthermore, the apparatus, operating at low temperature, is reliable in use, has long service life and is relatively easy and economical to manufacture. Other aspects and features of the present invention will be, in part, apparent and, in part, pointed out specifically in the following specification and in the accompanying drawings.

Briefly, the apparatus includes a wheel mounted for rotation on an axle with the wheel having a pair of spaced sidewalls and a rim for holding a tire. A support is fixedly held by the axle and a first plurality of spaced, electrically conductive vanes is held by the support so that they extend substantially radially inwardly from adjacent the rim with the support including a support plate located adjacent one of the wheel sidewalls. A second array of spaced, electrically and thermally conductive vanes extend radially outwardly and is interdigitated with but does not contact the first array of vanes. The second array is supported by the other wheel sidewall and is electrically insulated from the first array. An electro-rheological fluid floods the spaces between the arrays of vanes. Each vane of the second array has a cavity for receiving a secondary coolant. The apparatus also includes a secondary coolant tank carried by the other wheel sidewall which tank is located inwardly of the second array of vanes and open to the cavities to supply liquid coolant to the cavities. A boil-off valve is connected to the tank adjacent the portion thereof nearest the axle so that application of an electrical potential across the two arrays of vanes causes an increase in the viscosity of the electro-rheological fluid to develop a braking force. The liquid secondary coolant replaces boiled coolant due to centrifugal force, with the gaseous boil off being vented to atmosphere to relieve excess pressure in the tank.

BRIEF DESCRIPTION OF THE DRAWINGS

Corresponding reference characters indicate corresponding components throughout the several views of the drawings.

DESCRIPTION OF THE PREFERRED EMBODIMENT

Figures 1, 2:
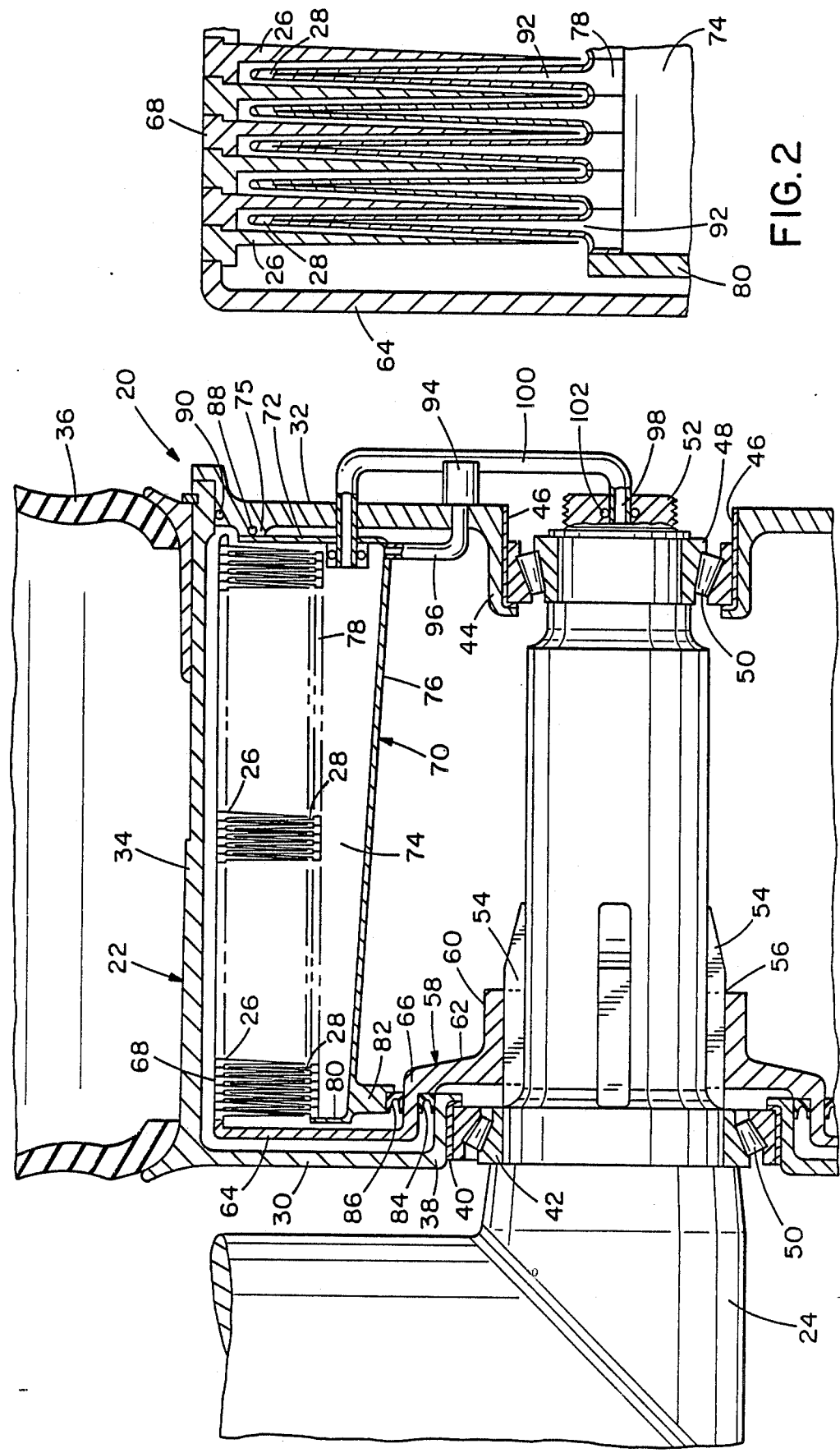
FIG. 1 is a front elevational view, with certain components shown in section, of combined wheel/brake apparatus embodying various aspects of the present invention.
FIG. 2 is an enlarged detail showing interdigitated movable and fixed vanes.

Referring now to the drawings, combined wheel/brake apparatus embodying various aspects of the present invention is generally indicated by reference numeral 20 in FIG. 1. The apparatus includes a wheel 22 rotatably mounted on an axle 24. A first array of spaced, electrically and thermally conductive vanes 26 is fixedly carried by the axle 24. A second array of spaced, electrically and thermally conductive vanes 28 is held by the wheel 22. The vanes 26 and the vanes 28 are interdigitated but each is spaced from adjacent members of the other array of vanes. An electro-rheological fluid is provided between the two arrays of vanes. The wheel 22 is free to rotate on the axle 24 when there is no substantial electrical potential across the arrays. However, with the first array grounded relative to the second array, application of a high voltage to the second array causes a significant increase in the viscosity of the electro-rheological fluid thereby developing a braking force to slow rotation of the wheel.

More specifically, the wheel 22 includes a pair of spaced sidewalls 30, 32 with a rim 34 extending therebetween for mounting a tire 36 in a conventional manner. The sidewall 30 has a hub portion 38 defining a central aperture lined by an electrically insulative sleeve 40 receiving a bearing 42 mounted on the axle 24. Similarly, the other sidewall 32 includes a hub portion 44 defining a central aperture lined by an insulative sleeve 46 receiving an outer bearing 48 also mounted on the axle. The bearings 42 and 48 preferably are of the type having asymmetrical rolling elements 50 for increased thrust capacity. The axle 24 terminates in a threaded stud 52 for receiving a nut (not shown) which holds the various components of the apparatus 20 mounted on the axle.

The axle 24 carries a number of regularly spaced keys or splines 54 for reception in keyways 56 formed extending radially outwardly from a central opening of a support 58 holding the first vanes 26. More specifically, the support 58 includes a hub 60 defining the central opening and keyways 56, an annular radially extending foot 62 connected to the hub, a support plate 64 positioned adjacent the sidewall 30, offset with respect to the foot 62 and joined thereto by an annular transition portion 66 concentric with the axle, and an outer member 68 extending from the annular plate 64 adjacent the rim 34. As best shown in FIG. 2, the first array of vanes 26, each of which is preferably annular and triangular in section, extend from the outer member 68 radially inwardly.

The apparatus 20 further includes an annular coolant tank 70 support by the wheel sidewall 32. More specifically, the tank has a lateral wall 72 extending beyond the volume 74 enclosed by the tank. The lateral wall 72 is attached to an annular boss 75 inwardly extending from sidewall 32. The tank further has an inclined bottom wall 76, a top wall 78 and another lateral wall 80 disposed adjacent support plate 64. The tank also includes a sealing foot 82 dependent from bottom wall 76 adjacent lateral wall 80.

A first annular spinning seal 84 is positioned between the support transition portion 66 and the first sidewall hub portion 38 while a second spinning seal 86 is held between the tank sealing foot 82 and the transition portion, to permit rotation of the wheel and tank with respect to the support 58 without substantial leakage of the electro-rheological fluid. A first sealing O-ring 88 is provided between the boss 75 and tank wall 72, and a second sealing O-ring 90 is located between wheel sidewall 32 and rim 34. The net effect is that a closed volume is provided for the electro-rheological fluid which includes not only the space between the interdigitated vanes, but additionally the spaces between outer member 68 and rim 34, between support plate 64 and wheel sidewall 30, and between the plate and the tank 70.

Referring to FIG. 2, each of the second vanes 28 is annular and held by the tank top wall 78. Each vane is generally triangular in cross section and extends radially outwardly between a pair of the first vanes 26. The vanes are each hollow, having a cavity 92 which, although isolated from the electro-rheological, is open to the interior 74 of the tank 70.

The apparatus 20 further includes a boil off valve 94 connected to interior of the tank, at a location adjacent the most inwardly disposed portion of the bottom wall 76, by a conduit 96 extending through the wheel sidewall 32. As is known to those of skill in the art, such a valve normally remains closed. However, upon pressure increasing to a predetermined level, the valve opens to vent to atmosphere a portion of the contents of the tank. Upon the pressure dropping below a predetermined level, the valve closes.

The axle 24 preferably has a central passageway 98 for supplying coolant to the tank 70 under pressure from a coolant reservoir (not shown). A conduit 100 (which is formed of electrically conductive material), extending through the sidewall 32 to the interior of the tank 70 outwardly of conduit 96, connects the passageway 98 to the tank. An O-ring 102 is provided to effect a seal between the conduit 100, which rotates with the wheel, and the stud 52.

The wheel/brake apparatus 20 is particularly adapted for use in an aircraft but is also applicable to other vehicles and machinery. The apparatus has relatively light weight and has a compact configuration. Furthermore, there is no need to add electro-rheological fluid or directly to cool that fluid because a separate cooling means may be provided. A possible coolant is kerosene which is a common fuel for jet aircraft. Thus the reservoir for the coolant can be the aircraft fuel tanks. Kerosene boils at a significantly lower temperature than the temperature at which the electro-rheological fluid loses its braking function. For other applications, it may be possible to use water as the secondary coolant.

The vanes 26 can be maintained at the system electrical ground by virtue of their connection to the electrically conductive axle 24 through the electrically conductive support 58. On the other hand, the wheel 22 and the conductive components carried by it are electrically isolated from the axle due to the presence of the insulative sleeves 40 and 46. A preferred way of energizing the second vanes 28 entails running a conductor (not shown) through the conduit 100. A rotatable connector, can be provided inside the axle. Accordingly, conventional electrical equipment can be used to effect selective electrical energization of the second array of vanes 28 from a power source.

Operation of the combined wheel/brake apparatus 20 of the present invention is as follows: Assuming (as an example) that an aircraft has just landed and the wheel 22 is rotating at high revolutions per minute, application of an electrical potential to the array of second vanes 28 results in a dramatic increase in the viscosity of the electro-rheological fluid in the spaces between the vanes 26 and 28 resulting in the development of a braking force. This results in the generation of heat which may be transferred through the thermally conductive second vanes 28 to the coolant inside of the cavities 92 in the vanes. With the continued application of the braking force, the temperature at the inside surfaces of the second vanes can rise sufficiently to cause boiling of the secondary coolant. The high centrifugal force attendant the high speed rotation of the wheel results in the denser liquid coolant replacing the less dense gaseous boil off in the cavities. The gaseous coolant is forced to the innermost portion of the tank 70, and, upon the increase of pressure within the tank to a predetermined level, the boil off valve 94 opens causing the gaseous coolant to be vented to atmosphere. A continuing supply of liquid coolant is provided from the coolant reservoir to the tank to the conduit 100. The deenergization of the second vanes 28 with the attendant loss of the potential difference across vanes 26 and 28 causes a return of the electro-rheological fluid to a lower viscosity state permitting free rolling of the wheel 22 upon the axle 24.

It will be appreciated that very close tolerance ranges can be used with the wheel/brake apparatus 20 because the load of the aircraft is through the bearings 42 and 48, and there is no appreciable load on the vanes which might result in their deflection toward one another upon landing. Accordingly, the vanes can be placed quite close together and the hollow vanes 28 can have relatively thin walls so that the coolant flow can be brought within five-thousandths of an inch of the electro-rheological fluid to assure effective heat transfer. The voltage controlling the viscosity of the fluid may also be pulsed to enhance the heat transfer within the electro-rheological fluid. This can further reduce the importance of any thermal performance limitations of the electro-rheological fluid itself.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Combined wheel/brake apparatus, employing electro-rheological fluid, for mounting on an axle, said apparatus comprising:
    a wheel rotatably mounted on said axle;
    a first plurality of spaced, electrically and thermally conductive vanes extending in a first direction, and held fixed by said axle;
    a second plurality of spaced, electrically and thermally conductive vanes extending in a direction opposite said first direction, interdigitated with but not contacting said first plurality of vanes carried by said wheel and electrically insulated from said first plurality of vanes;
    an electro-rheological fluid disposed between said first and second pluralities of vanes, at least some of said vanes having a coolant passageway; and
    means for supplying a coolant to the coolant passageways, said coolant passageways being isolated from said electro-rheological fluid whereby application of an electrical potential across said two pluralities of vanes causes an increase in the viscosity of said electro-rheological fluid among said vanes to develop a braking force, heat occasioned by the braking being transmitted to said coolant.

2. Apparatus as set forth in claim 1 wherein said second plurality of vanes extends substantially radially outwardly with respect to said axle, each vane of said second plurality of vanes having a cavity forming one of said passageways.

3. Apparatus as set forth in claim 2 wherein said coolant as supplied to said second plurality of vanes is a liquid, said apparatus further comprising a tank for holding said coolant liquid, said tank being carried by said wheel and positioned inwardly of said vanes, each of said cavities opening to the interior of said tank.

4. Apparatus as set forth in claim 3 further comprising boil off means connected to said tank for relieving excess pressure from said tank, whereby upon application of braking force sufficient to cause boiling of the coolant in said cavities, centrifugal force causes the denser liquid coolant to replace gaseous coolant in said cavities and, upon the pressure in said tank reaching a predetermined pressure, said boil off means opens to vent the gaseous coolant to atmosphere.

5. Apparatus as set forth in claim 4 wherein said tank has an inclined floor, said boil off means being connected to the interior of said tank adjacent the portion of said floor closest the hub of said wheel.

6. Apparatus as set forth in claim 4 wherein said means for supplying a coolant includes a supply conduit connected to said tank at a location outwardly of the connection of said boil off means.

7. Apparatus as set forth in claim 6 wherein said axle has a central passageway for supplying said liquid coolant, said supply conduit connecting said central passageway to said tank.

8. Apparatus as set forth in claim 4 wherein each of said vanes and said tank is annular.

9. Apparatus as set forth in claim 1 wherein said wheel comprises a pair of spaced sidewalls and a rim extending between said sidewalls for holding a tire, said first and second pluralities of vanes being positioned between said sidewalls.

10. Apparatus as set forth in claim 9 further comprising support means held by said axle and supporting said first plurality of vanes, said support means including an outer member extending adjacent said rim, with said first plurality of vanes extending radially inwardly therefrom.

11. Apparatus as set forth in claim 10 wherein said support means further including a support plate extending adjacent one of said sidewalls and holding said outer member, said support plate having a central aperture receiving said axle.

12. Combined wheel/brake apparatus employing electro-rheological fluid for mounting on an axle, said apparatus comprising:
    a wheel rotatably mounted on an axle and including a pair of spaced sidewalls and a rim extending between said sidewalls for holding a tire;
    support means non-rotatably held by said axle,
    a first plurality of spaced, electrically conductive vanes supported by said support means extending substantially radially inwardly from adjacent said rim, said support means including a support plate disposed adjacent one of said sidewalls;
    a second plurality of spaced electrically and thermally conductive vanes extending radially outwardly, interdigitated with but not contacting said first plurality of vanes, supported by the other of said sidewalls, and electrically insulated from said first plurality of vanes;
    an electro-rheological fluid disposed between said first and second pluralities of vanes, each vane of said second plurality of vanes having a cavity;
    a coolant tank carried by said other sidewall, disposed inwardly of said second plurality of vanes and open to said cavities to supply a liquid coolant to said cavities;
    a boil off valve connected to said tank adjacent the portion of said tank nearest said axle whereby application of an electrical potential across said two pluralities of vanes causes an increase in the viscosity of said fluid between said pluralities of vanes to develop a braking force, denser liquid coolant replacing boiled coolant due to centrifugal force with the gaseous coolant being vented to atmosphere to relieve excess pressure.

13. Apparatus as set forth in claim 12 wherein said axle has a central liquid coolant passageway, said apparatus further comprising a conduit connected to said tank outwardly of the location of the boil off valve connection, for supplying liquid coolant to said tank from said passageway.

* * * * *